April 22, 1941. R. O. L. SERCKX 2,239,577
PROCESS FOR TERMINATING THE FLOW OF ARC WELDING CURRENT
Filed Aug. 24, 1937
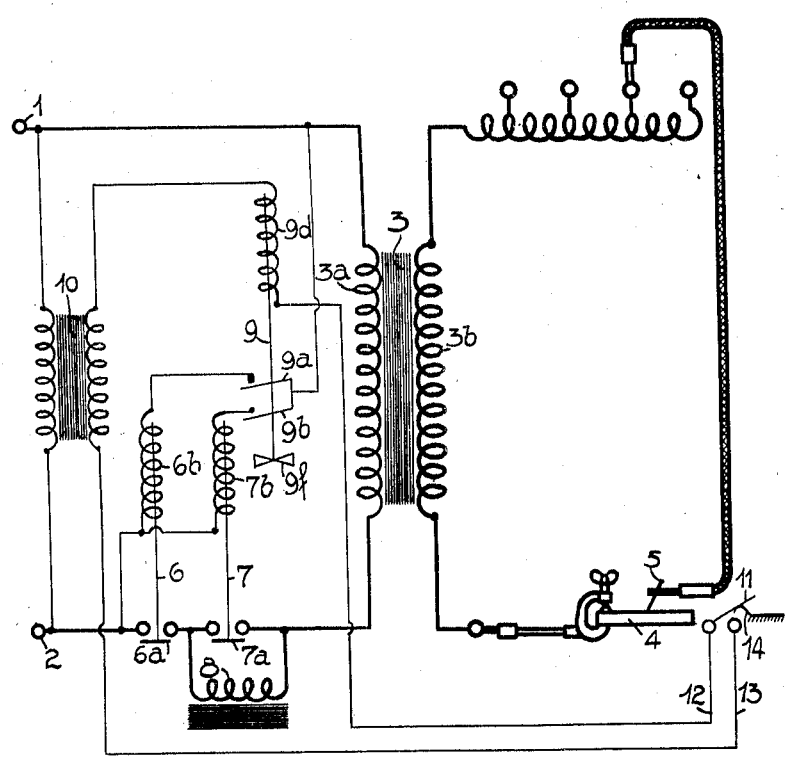
INVENTOR
R. O L. SERCKX
By Your Emery & Thompson
ATTYS.

Patented Apr. 22, 1941

2,239,577

UNITED STATES PATENT OFFICE 2,239,577

PROCESS FOR TERMINATING THE FLOW OF ARC WELDING CURRENT

Robert Olivier Louis Serckx, Saint-Gilles, Brussels, Belgium, assignor to La Soudure Electrique Autogène, Société Anonyme, Brussels, Belgium Application August 24, 1937, Serial No. 160,684
In Germany August 5, 1937

1 Claim. (Cl. 219—8)

The present invention relates to a device for controlling the rupture of the current in a welding circuit. It is applicable when the current supplied is direct current or alternating current.

The description of the present invention which follows relates more especially to a device in which alternating current is supplied from a welding transformer but the invention is in no way limited to the kind of current or the kind of generator employed.

The object of the invention is to avoid the formation of the crater which is produced at the end of the welding fillet when the arc is broken by its abrupt elongation by hand. If this crater is allowed to remain when a fresh fillet is started, surface irregularities are produced which detract from the appearance and the continuity of the weld; furthermore, the inclusion of slag in the region where welding is recommenced is always to be feared.

According to the invention, the formation of this crater may be avoided by reducing the welding current for some seconds in one or more stages or in a continuous manner by connecting one or more impedances in the welding circuit.

In the present patent the term "impedance" is to cover not only the apparent resistance of a circuit traversed by an alternating current but also the true resistance of a circuit traversed by a direct current.

The heat evolved by the reduced current is not great enough to cause the deposition of any more than a very small quantity of metal on the part to be welded but nevertheless allows the deposited metal to flow into the crater and to fill it.

An advantageous arrangement for carrying out the process of the invention comprises at least one impedance shunted across a circuit breaker arranged in the welding circuit and closed during welding so as to short circuit the said impedance but which may be opened shortly before the opening of another circuit breaker arranged in the welding circuit in series with the first circuit breaker and arranged so as to stop the supply of welding current when opened. The time during which the impedances are connected in the welding circuit before the opening of the latter is advantageously controlled by a time relay, the energizing coil of which is connected in an auxiliary low tension circuit closed by a switch arranged preferably within the reach of the welder.

Other features and details of the invention will be revealed in the course of the description of the drawing attached to the present specification.

This drawing represents diagrammatically and solely by way of example an embodiment of a device according to the invention supplied with alternating current from a single phase welding transformer.

This figure is a circuit diagram of this embodiment.

1 and 2 represent the terminals for connection to a source of alternating current supplying the primary winding 3a of a welding transformer 3. The secondary winding 3b of this transformer is permanently connected on the one hand to the part to be welded, and on the other hand to an electrode 5.

In series with the primary winding 3a there are circuit breakers 6 and 7, provided with an arc extinguishing device. These circuit breakers are, for example, circuit breakers of the magnetic blow-out type. An induction coil 8, shunted across the contact member 7a of the circuit breaker 7 serves to reduce the current in the welding circuit when the circuit breaker is opened. The contact member 6a of the circuit breaker 6 serves to open or close the primary circuit of the transformer 3.

The contact members 6a and 7a of the circuit breakers 6 and 7 are constantly urged into one of their two possible positions. They tend for example to occupy the position in which they open the primary circuit under the action of gravity. They may be brought into the position for closing the primary circuit when current flows through the electromagnets 6b and 7b which are constructed so that they may be supplied at the same voltage as the primary winding 3a of the welding transformer 3. These electromagnets 6b and 7b are connected to contact tongues 9a and 9b of a time relay 9, the low tension supply circuit of which comprises an energizing coil 9d supplied by an auxiliary energizing transformer 10, when a switch 11, connected to the secondary winding of this transformer by conductors 12 and 13 and placed within the reach of the welder, is closed. This switch 11 is, for example, constructed in such a manner that under the action of a spring 14 it tends always to assume the position in which the energisation circuit of the time relay 9 is open.

Let us examine the method of operation of the device.

Let us assume that the contact members 6a and 7a of the circuit breakers 6 and 7 are open. In order to strike the arc the electrode is first placed upon the work to be welded at the exact spot where it is desired to begin welding.

The welder then closes the switch 11. The low tension current may then flow in the energising coil 9d of the time relay 9 causing the closing of the contact tongues 9a and 9b corresponding to the circuit breakers 6 and 7 which in turn close the primary circuit of the transformer 3.

There is then a difference of potential between the electrode 5 and the part 4 and the arc may be struck. In order to terminate the fillet, the switch 11 is released which opens under the action of its spring 14. The time relay 9 becomes de-energised, causing the immediate opening of the contact tongue 9b corresponding to the energising coil of the circuit breaker 7, which opens in turn, thus automatically connecting, in the primary circuit of the transformer 3, the coil 8 which limits the welding current. The time relay is provided with an adjustable clock-work 9f which will open the circuit of the electromagnet 6b of the circuit breaker 6 only after a predetermined time. The circuit breaker 6 then in turn opens the primary circuit of the transformer 3.

The device described above causes the welding current to be interrupted by delayed action in a single step. By increasing the number of circuit breakers such as 7 and coils as 8 and also contact tongues of the time relay 9, the welding current can easily be interrupted by delayed action in as many steps as are desired, or even practically continuously.

It is to be noted that the device also has advantages from the point of view of economy, because it avoids connection of the transformer to the source of current during the periods of inactivity of the welder, which results in a saving during this time of the no load losses of the transformers, which are never negligible.

It is also to be noted that in another form of the invention, the circuit breakers 6 and 7 may be connected in series in the secondary circuit of the welding transformer 3. This arrangement would be, however, less advantageous since it would be necessary to interrupt much larger currents which may be of several hundred amperes.

Experience has proved that the coil 8 may be constant whatever the welding current may be, and that furthermore, the reduction of welding current necessary for obtaining the effects desired by single stage delayed action interruption is, for example, from 30 to 35% of the normal current for a given electrode.

The time during which the current of reduced intensity is to flow in order to obtain the desired effect is a few seconds, for example 4 to 5 seconds.

It is evident that the invention is not limited to the embodiment represented, and that other modifications may be made in the form, the arrangement and the constitution of certain elements used in carrying it into effect without exceeding the scope of the present patent.

The arrangement according to the invention is clearly applicable for controlling the supply of direct current to a welding circuit. In this case, the circuit breakers 6 and 7 are connected in series with the electrode and the work to be welded. These circuit breakers are controlled by an auxiliary source of current independent of that which supplies the welding current.

The device according to the invention may be advantageously employed for automatic welding with an apparatus having an automatic feed for the electrode, since with an apparatus of this kind it is not possible to obtain electrode movements similar to those made by skilled welders for partly filling the crater which is usually produced at the end of a weld. The arrangement according to the invention allows of a perfect joint between the beginning and the end of a weld in the case of circular parts for example.

What I claim is:

In a process of electric arc welding, the steps consisting in reducing the welding current from 30 to 35% for some seconds at the end of the welding operation, and subsequently breaking the current, these two steps being carried out while the end of the electrode is maintained in its normal welding position.

ROBERT OLIVIER LOUIS SERCKX.